United States Patent
Hehl

[11] Patent Number: 5,811,139
[45] Date of Patent: Sep. 22, 1998

[54] DEVICE FOR FIXING A BALL SCREW/NUT MECHANISM SAFE FROM TURNING

[76] Inventor: Karl Hehl, Arthur-Hehl-Str. 32, D-72290 Lossburg, Germany

[21] Appl. No.: 824,835
[22] Filed: Mar. 26, 1997

Related U.S. Application Data

[63] Continuation of Ser. No. 408,031, Mar. 21, 1995, abandoned.

[30] Foreign Application Priority Data

Apr. 2, 1994 [DE] Germany .................. 44 11 651.9

[51] Int. Cl.[6] .................. B29C 33/22; B29C 45/68
[52] U.S. Cl. .................. 425/590; 192/141; 425/451; 425/451.2; 425/451.7; 425/595
[58] Field of Search .................. 425/589, 590, 425/595, 451.2, 451.7; 74/89.15; 192/141

[56] References Cited

U.S. PATENT DOCUMENTS

| | | | |
|---|---|---|---|
| 3,611,502 | 10/1971 | Florjancic | 425/451.7 |
| 4,466,511 | 8/1984 | Garnett | 192/141 |
| 4,797,086 | 1/1989 | Adachi | 425/589 |
| 4,864,882 | 9/1989 | Capewell | 192/141 |
| 4,966,738 | 10/1990 | Inaba et al. | 425/589 |
| 4,984,890 | 1/1991 | Ueno | 425/595 |
| 5,322,430 | 6/1994 | Kasai et al. | 425/595 |

FOREIGN PATENT DOCUMENTS

| | | |
|---|---|---|
| 0 271 588 | 9/1991 | European Pat. Off. . |
| 0 576 925 | 1/1994 | European Pat. Off. . |
| 2121807 | 5/1990 | Japan . |
| 05345339 | 12/1993 | Japan . |
| 1184909 | 3/1970 | United Kingdom . |

OTHER PUBLICATIONS

Patent Abstracts of Japan, M–618, Aug. 21, 1987, vol. 11, No. 258—Japanese Patent 62–64520, Mar. 23, 1987.

*Primary Examiner*—Patrick Ryan
*Assistant Examiner*—Joseph Leyson
*Attorney, Agent, or Firm*—Spencer & Frank

[57] ABSTRACT

In a device for fixing a ball screw/nut mechanism, including a ball screw and a ball nut, safe from turning. The ball screw/nut mechanism generates a linear movement to displace a first subassembly until it rests on a second subassembly. A blocking device is provided, which is adapted to fix the rotating part of the ball screw/nut mechanism, when both subassemblies are in contact, safe from turning through a reaction force originated by an external force and by overcoming the force of a first resetting means. When the parts are in contact, the blocking device is positioned in a determined distance from the first subassembly, and when the external force, generated by the drive device, arises the turnable part is safe from turning, until the determined distance between the first subassembly and the blocking device is compensated for.

9 Claims, 4 Drawing Sheets

DEVICE FOR FIXING A BALL SCREW/NUT MECHANISM SAFE FROM TURNING

This application is a continuation of application Ser. No. 08/408,031, filed Mar. 21, 1995, now abandoned.

BACKGROUND OF THE INVENTION

1. Field of the Invention

This invention relates to a device for fixing a ball screw/nut mechanism for moving a first subassembly, to a second subassembly safe from turning, comprising at least two parts in form of a ball screw, on one hand, and of a ball nut cooperating with the ball screw, on the other hand, wherein a first of these two parts is fixed safe from turning and a second of these two parts is turnable. A resilient first resetting means acting by a determined force, which has to be overcome for fixing the second part, moves the second part in the longitudinal direction of the ball screw. A first supporting element is provided at which the second part of the ball screw/nut mechanism is supported. A drive device is provided to set rotating the second part for generation of a linear movement of the first subassembly until the first subassembly rests on the second subassembly. Blocking means are adapted to fix the second part secure from turning when the second part rests at the first subassembly or at the first supporting element via a reaction force originated by an external force and overcoming the determined force of the first resetting means.

2. Description of the Prior Art

A device of this kind is known from European Patent B 271 588. In this unit two spindle systems are connected in series, as especially shown in FIG. 3, which produce the movement of the movable mold carrier, on the one hand and the summoning-up of the closing force, on the other hand, during which the mold closing motion is effected. Whereas in the first two embodiments of this printed document electromagnetical couplings are provided adapted to isolate the respective not required spindle from the power flux, in the third embodiment braking means and claw couplings are arranged. In case a claw coupling is used, the coupling is effected against the force of a spring, which force is adjusted in a way, that a form-fit coupling is possible in spite of the force of the spring when the closing force is built-up. In so far a reversed rotation of the spindle is admitted until the form-fit coupling has been performed, which makes the regulation of the closing force more difficult. If, however, only braking means are provided, the couplings are subject to considerable wear due to the high number of stress cycles.

Concerning injection molding units, European Patent A 576 925 discloses a device in which two spindle drives are connected in series, wherein one of the spindle drives is supported at the stationary mold carrier against the force of springs. In this area a force accumulator is provided, adapted to disconnect the motor for placing the nozzle during the injection process of the injection unit.

SUMMARY OF THE INVENTION

It is an object of the invention to provide a device for fixing a ball screw/nut mechanism secure from turning, in that life and wear resistance of the device are favorably increased.

That object is accomplished in accordance with the invention, in that, when the second part is in a resting position, the blocking means are separated via a distance from the first subassembly or the first supporting element, and that when the external force acts the second part is secured from turning via the drive device until the distance between the first subassembly and the blocking means or between the first supporting element and the blocking means is eliminated.

Such an arrangement for fixing a ball screw/nut mechanism safe from turning can be used in the most different kind of machines able to carry out linear movements. The following are some examples: machine tools, injection molding machines for processing synthetic materials, powdery masses and the like, or robots.

When mold closing units are used in injection molding machines for processing synthetic materials often high pressure forces have to be summoned-up (generated). Under these high pressure forces, the ball screw would rotate in a reverse direction by itself, due to its high efficiency. On the other hand, it is often desired to manage a controlled process of these movements. However, this would require an exact position detection of the parts to be moved, which can be falsified by such a reversed rotation. In the present arrangement the lock of the reverse-lock consists of the actual pressure elements, which are directly integrated into the power flux. When the spindles are not working, the closing force is preferably built-up by an additional movement, which, if necessary, is generated by an additional unit, so that friction forces, and thus wear of the blocking means, are avoided. As soon as the spindle is blocked, the drive motors can be disconnected in an energy-saving way. Since the spindles themselves are merely used as locking force transmitters and not as locking force generators, they can be dimensioned smaller, or in case of larger spindles, life is correspondingly increased, since the dynamic load is lower. The dynamic load, however, influences the total life of the spindle system directly.

DETAILED DESCRIPTION OF THE PREFERRED EMBODIMENTS

Figure 1:
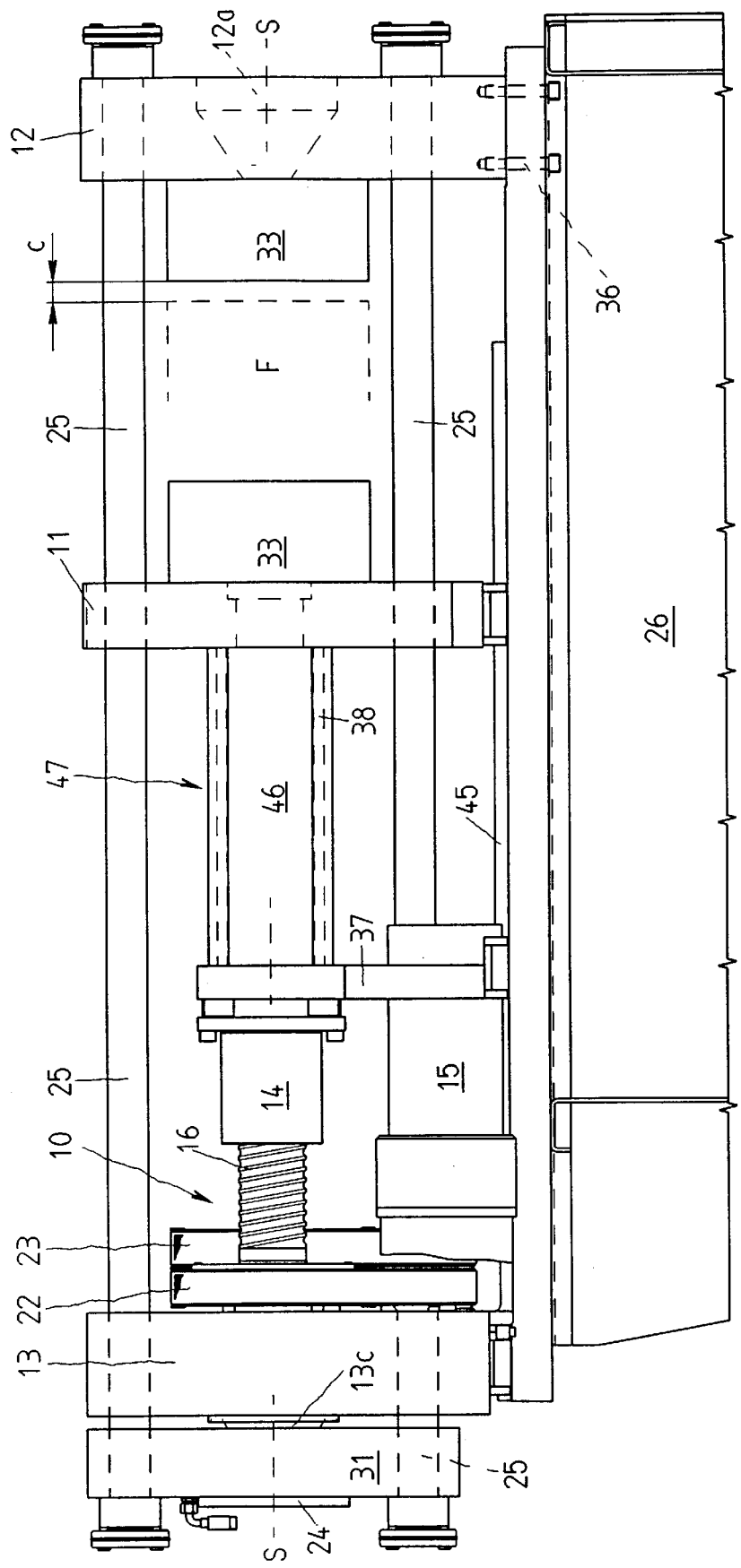
FIG. 1 shows a side view of an injection molding machine in which the device is installed in a mold closing unit.
Figure 2:
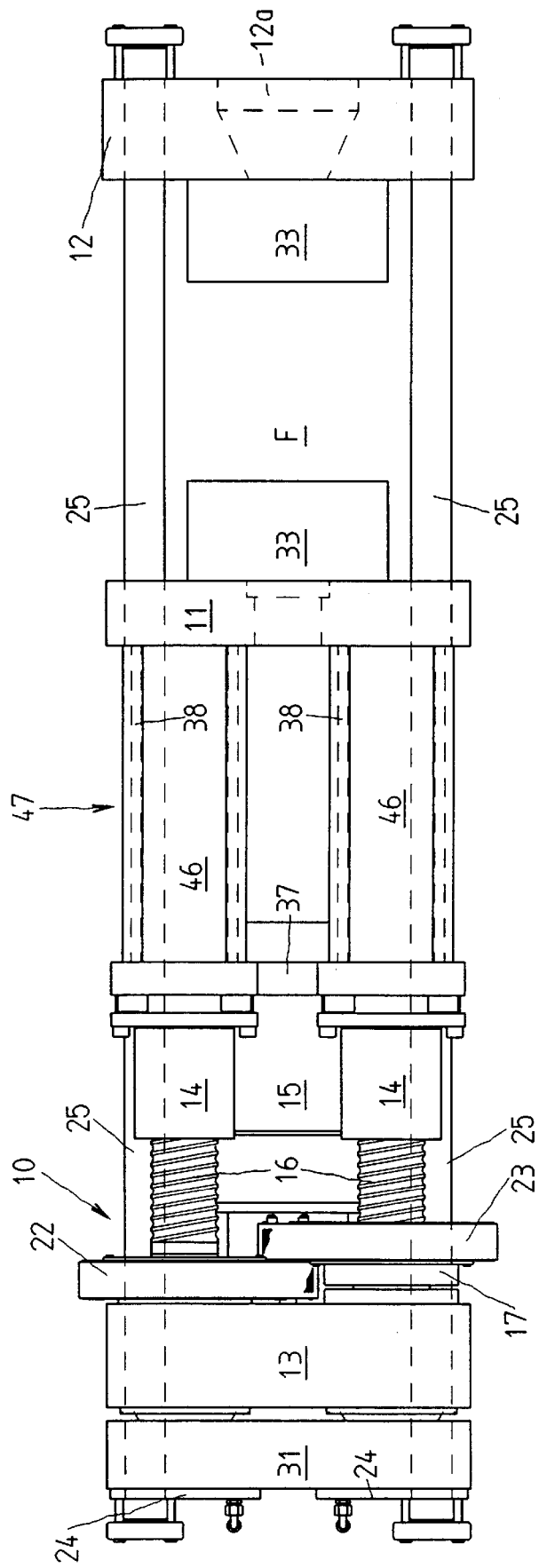
FIG. 2 is a top view on the injection molding machine according to FIG. 1.

The invention will now be described in more detail by example with reference to the embodiments shown in the Figures. It should be kept in mind that the following described embodiments are only presented by way of example, and should not necessarily be construed as limiting the inventive concept to any particular physical configuration.

The device serves for fixing a ball screw/nut mechanism 10 safe from turning and comprises at least two parts constituted by a ball screw 16 on the one hand, and a ball nut 14 cooperating with the ball screw 16 on the other hand. Either the threaded ball screw 16 or the nut 14 are fixed secure from turning and constitutes a first part, whereas the respective second part is turnable and movably fixed against the force of a resilient first resetting means 18 in a longitudinal direction of the ball screw 16. The ball screw/nut mechanism 10 is supported by a first supporting element 13, at which either the ball screw 16 or the ball nut 14 is placed. Furthermore, the ball screw/nut mechanism 10 is movably fixed at a first subassembly (for example a motion unit 47), which is linearly moved via a drive device 15 adapted to set rotating the turnable second part of the ball screw/nut mechanism 10. By this movement the first subassembly is moved until it rests on or reaches a second subassembly. The first part of the ball screw/nut mechanism 10 is preferably fixed stationarily and secure from turning at the first subassembly.

To avoid a reversed rotation of the ball screw 16 under load, the turnable second part is safed (prevented) from turning when the first subassembly reaches the second subassembly as a result of a reaction force originated by an external force that overcomes the force of the first resetting means 18 in that it is rested at the respectively next bearing point of the ball screw/nut mechanism 10, i.e. either at the first supporting element 13 or at the first subassembly. However, the blocking means 17 are arranged so that there is a distance between the blocking means and the first subassembly or the first supporting element 13, even if both subassemblies rest on each other. When the external force arises, the turnable second part is held safe from turning by the drive device 15, until the distance between the first subassembly and the blocking means 17, of the distance between the first supporting element 13 and the blocking means 17, is eliminated.

Due to its two-stage-movement-operating-method, this device can be multiply used in machines and especially in injection molding machines for processing synthetic materials. For this reason the invention will now be described in more detail with reference to the embodiments shown in the Figures taking as an example an injection molding machine for processing synthetic materials, that is strictly speaking, a mold closing unit of such a machine.

From that point of view the first subassembly is a movable mold carrier 11, which is moved by the ball screw/nut mechanism 10. The mold carrier 11, is displaced until it rests on the second subassembly, which is a stationary mold carrier 12. The external force is generated by a device 24 provided for generating the closing force while at the same time blocking the threaded spindles.

The device 24 for generating the closing force is actuated after the actuation of the ball screw/nut mechanism 10 during the actuation of the mold closure. The ball screw/nut mechanism 10 is supported by the first supporting element 13, which is connected with the stationary mold carrier 12 using a force transmitting means 25.

A second supporting element 31 for supporting the device for summoning-up the closing force 24 is provided behind the first supporting element 13 relative to the closing direction and seen from the movable mold carrier 11. If this device is actuated, it engages or briefly spoken pressurizes the ball screw/nut mechanism 10, the first supporting element 13 and the movable mold carrier 11 in their entirety as a closing force transmitter. The closing force, however, is only generated by the device 24 for summoning-up the closing force. Since the force distribution is organized that clearly, the drive motors can be exactly adjusted to their respective function, so that smaller and less expensive drive motors can be used in the spindle mechanism.

The power flux starts from the movable mold carrier 11 and runs initially to the device 24 for generating the closing force to the first supporting element 13, which is connected with the second supporting element 31 via transmission elements. The first supporting element 13 and the movable mold carrier 11 are also movably held at the force transmitting means 25. Starting from the second supporting element 31 the power flux continues to the force transmitting means 25, which in the present embodiment are spars, to the stationary mold carrier 12. Instead of the spars, other elements can be provided as force transmitting means, which lead the closing force around the mold entering space F. It is also possible to use the machine base as the force transmitting means. The whole mold closing unit is only connected with the machine base at the stationary mold carrier 12 by fixing means 36.

Figure 3:
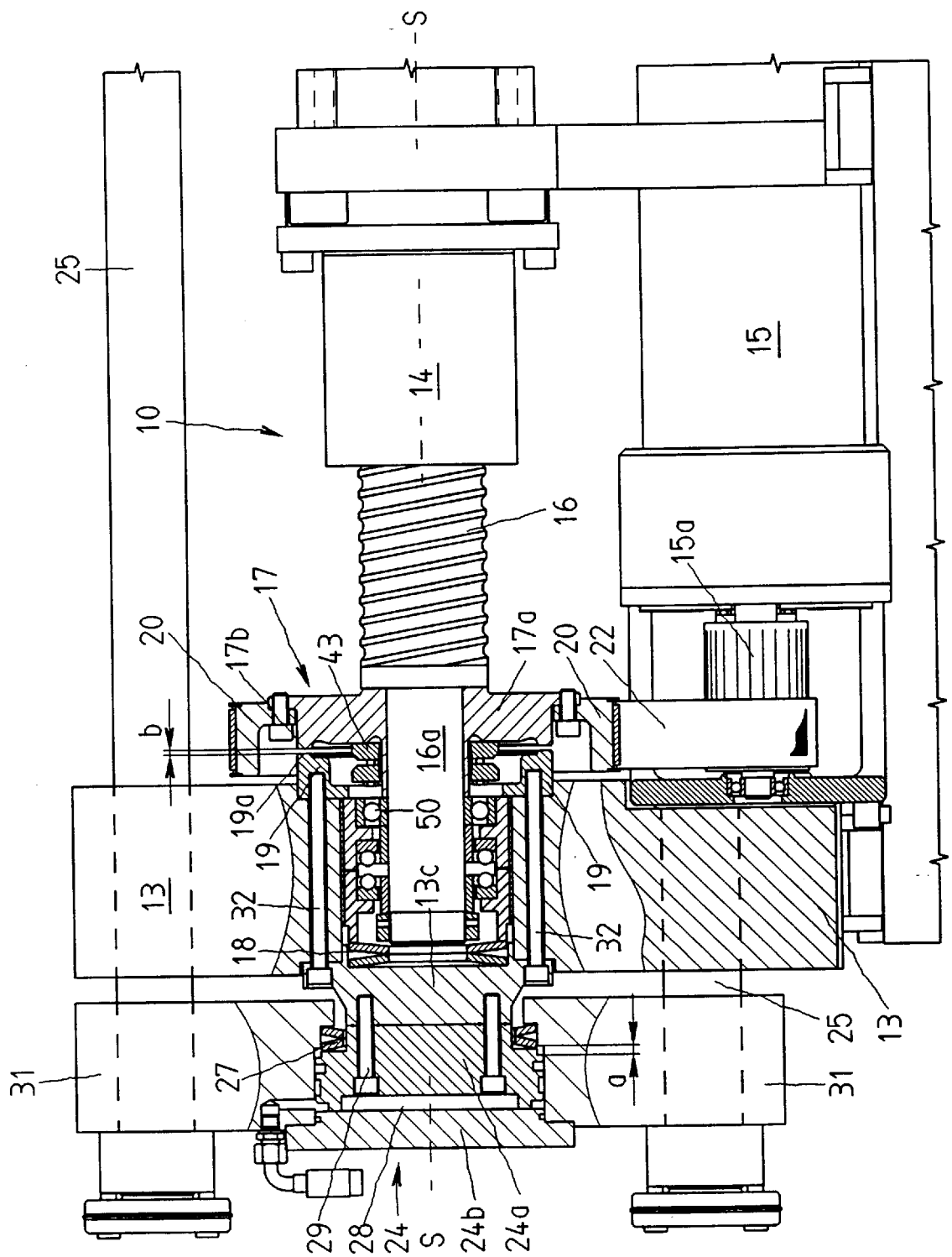
FIG. 3 is an enlarged, partial view from FIG. 2 in the area of the device.
Figure 4:
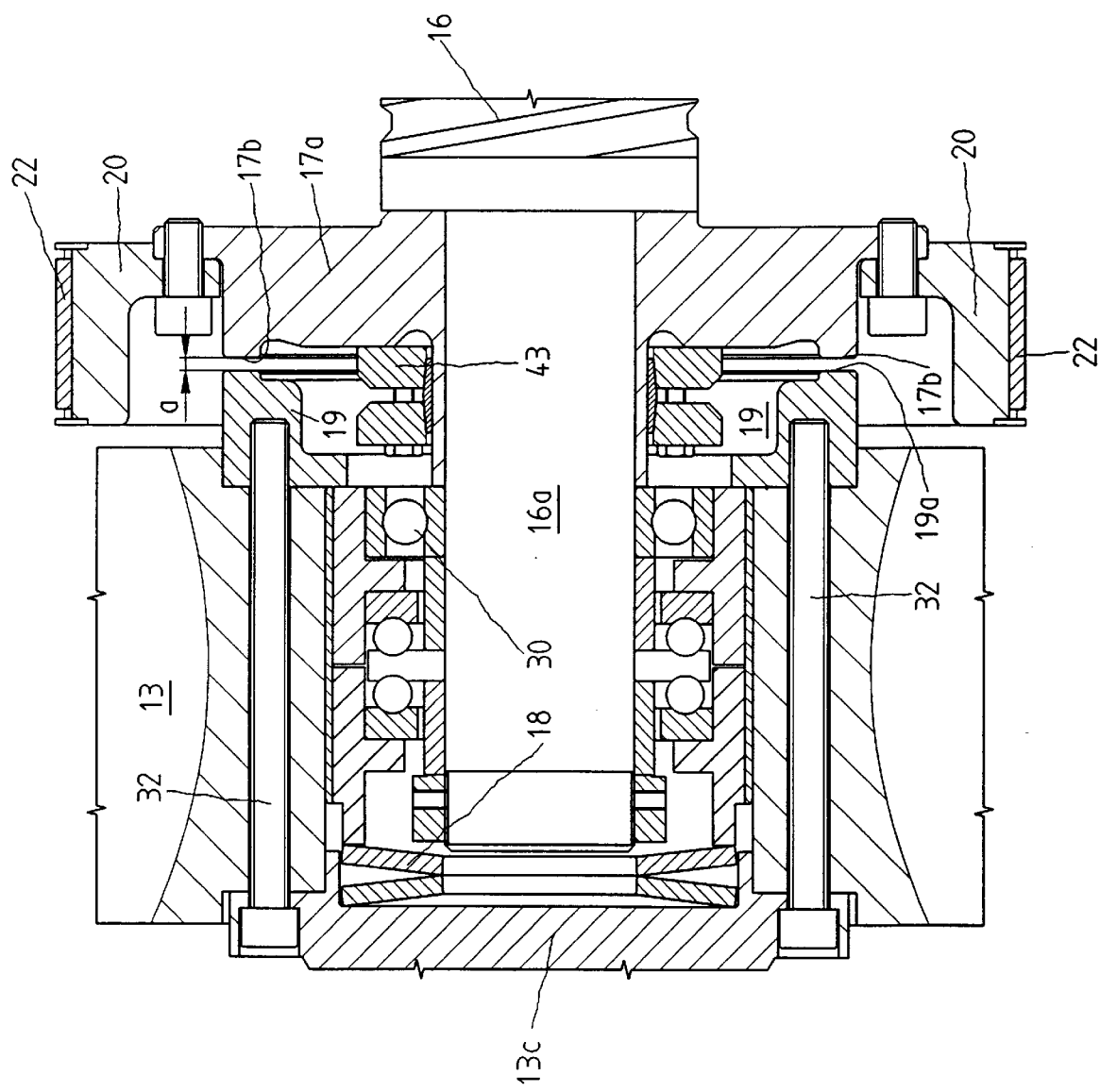
FIG. 4 shows another enlarged partial view from FIG. 3.

As device 24 for generating the closing force a hydraulic drive is provided. A fitting strip 13c according to FIG. 3 is connected with a piston 24a of the hydraulic drive unit via studs 29. The hydraulic drive unit is provided with a cylinder chamber 28, which is locked by a cylinder cover 24b. The motion is effected against the force of resilient second resetting means 27, which ensures that the necessary distance between the first supporting element 13 and the second supporting element 31 exists, even if the mold is in an opened position.

The ball screw/nut mechanism is provided with two ball screws 16, which partially compensate for the high reverse torques when the mold is closed. This way the guiding systems are less stressed. The ball screw 16 cooperates with the nut 14, which is supported in the mold closing unit by a supporting element 37. Furthermore, the supporting element 37 is connected with the movable mold carrier 11 via tension rods 38. The tension rods 38 serve to clamp tubes 46 between the supporting element 37 and the movable mold carrier 11. This way a stiff and easily guidable motion unit 47 is created by these parts, which increases the precision of the machine. The length of the motion unit is above all determined by the tubes 46, which receive the ball screws 16, and thus by the stroke of the spindle, so that if larger machines are used, the length of the motion unit and consequently the support is also improved. Besides, this factor contributes to increase the precision of the whole mold closing unit. The drive for the ball screws 16 (it is also possible to provide only one) is realized via a drive device 15 whose motor shaft 15a drives two belts 22, 23, which rotate two pulleys 20, 21. Alternatively, and to reduce the noise, a transmission gear may be used, also reducing the length of the machine.

The blocking means 17 are provided to avoid a reversed rotation of the ball screw 16, i.e. the turnable second part, when the closing force is generated. The blocking means 17 comprise a blocking disc 17a, which is held fast at an axle 16a of the ball screw 16 by shrinkage means 43. The axle 16a itself is supported by bearings 50 and is movable against the force of the resilient first resetting means 18 in a longitudinal direction of the spindle or ball screw. When the closing force is generated the blocking disc 17a comes in contact with the first supporting element 13. The blocking disc 17a is provided with a surrounding ring 17b extending in a longitudinal direction of the ball screw 16, which comes into frictional connection with a ring-shaped projecting part 19a of a bearing ring 19 of the supporting elements, mounted in opposite direction, during the blocking process at the second subassembly. If necessary, the ring 17b and the ring-shaped projecting part 19a for building-up a form-fit connection can also be used in dented execution. The bearing ring 19 is connected with the fitting strip 13c by studs 32. The bearing of the axle 16a is placed between these two elements. In the present embodiment, the blocking disc 17a is at the same time the hub of the pulleys 20,21. Nut and spindle are interchangeable with respect to their function.

The distance b between the ring 17b of the blocking disc 17a and the ring-shaped projecting part 19a of the bearing ring 19, existing when the mold is in a closed position and before the closing force is generated, is smaller than the maximum stroke a of the piston 24a. Other types of devices rather than a hydraulic device, for example electromagnetic eccentric drives, for a device 24 are conceivable.

Basically, the operation is as follows: Initially a mold 33 is closed by the ball screw 16. The distance b is kept constant by first resetting means 18 until the two parts of the mold 33 come in contact. Thereupon the device 24 is connected, however, first the distance b has to be eliminated. At that time the drive device 15 still has to be activated in order to avoid a reversed rotation of the ball screw 16. However, as soon as the distance b is eliminated, movement of the ball screw 16 is blocked due to the frictional connection, so that during the further process of summoning-up force the blocking device merely is a pressure element integrated into the power flux. By this, the bearings are only stressed by those forces that arise when the movable mold carrier 11 is accelerated and respectively braked. In the actual high pressure area of the mold locking, the bearings of the spindles are maximumly loaded with the force of the first resetting means which are formed as spring washers. This way, the motions and forces to be generated are specifically assigned to individual subassemblies. The spring washers are adjusted so strongly that when the mold carrier 11 is moved, no blocking is possible. Blocking will only occur after the device 24 has been connected. After the blocking, the drive device 15 is disconnected in an energy-saving manner. The blocking device is preferably formed in such a way that sliding between blocking disc 17a and the bearing ring 19 is avoided. Until the two parts 17a, 19 come in contact due to the operation of the device 24 for summoning-up the closing force, the drive device 15 is run, so that the two parts come in contact while they are non-operative, i,e., when the blocking disc 17a rests and then comes in touch frictionally or form-fit.

The whole mold closing unit is largely mounted symmetrically with respect to a vertical center plane. The two pulleys 20, 21 of the device 24 are arranged staggered against one another in the closing direction s-s as can be seen from the Figures. Another advantage of such a symmetrical arrangement is, especially when two ball screws 16 are applied, that an ejection unit can be provided between the two spindles, if necessary. The stationary mold carrier 12 is additionally provided with an opening orifice 12a, through which an injection unit can be approached to the mold cavity of the mold 33.

The device for generating the closing force 24 also permits control of the closing force. This way it is possible to join the two mold parts (in FIG. 1 the mold closure is represented by the dotted lines; the split dimension C=0), and to actuate the device 24 by a determined dimension, so that a certain desired and presettable closing force can be built-up. This arrangement is of special advantage, if the molds 33 in the machine are not or should not be pressurized with the full power of the mold closing unit It is also possible to realize transfer molding for example, by approaching the two mold parts until the determined split dimension c is reached and then transfer the mold closing unit into its final position by the second unit. By this it is also possible to limit the maximum force to be generated with respect to the upper value.

The control requires different auxiliary means for determination of the regulation parameters. For example, it is possible to provide a drive with an absolute distance measuring system for determination of the position of the movable mold carrier 12. If a motor with incremental distance measuring is used, additional separate linear potentiometers, mounted parallel with respect to the spindle axis, are applied, which securely detect and indicate the actual position of the movable mold carrier. It is also possible to readjust the correct closing force by force measuring studs arranged in spars. However, the force measuring studs or load cells can be arranged at any place desired that lies within the power flux, for example if an eccentric is used, within the bearing stud.

I claim:
1. An apparatus comprising
   (a) a first subassembly linearly movable in a path of travel;
   (b) a second subassembly aligned with said path of travel; said first subassembly being movable into an abutting contact with said second subassembly;
   (c) a first supporting element aligned with said path of travel and being supported for displacement parallel to said path of travel;
   (d) a ball screw/nut mechanism composed of
      (1) a first component held in said first supporting element for rotation and axial displacement relative thereto;
      (2) a second component threadedly mounted on said first component and being arranged for linear travel relative to said first component upon rotation of said first component; said first subassembly being attached to said second component for travelling therewith along said path of travel;
   (e) blocking means having an engaged state for preventing rotation of said first component and a disengaged state for allowing rotation of said first component; said blocking means including
      (1) a blocking component affixed to said first component to axially move therewith as a unit; and
      (2) a counter face carried on said first supporting element; said counter face being in engagement with said blocking component in said engaged state of said blocking means;
   (f) resilient resetting means for axially urging, with a resetting force, said first component outwardly of said first supporting element to maintain a clearance between said blocking component and said counter face in said disengaged state of said blocking means;
   (g) first drive means for imparting a torque to said first component in said disengaged state of said blocking means as long as said clearance is present in any magnitude to urge said first component into rotation for causing said second component and said first subassembly to travel towards said second subassembly until said first subassembly arrives into an abutting contact with said second subassembly;
   (h) second drive means for imparting a linear pressing force to said first component towards said second subassembly in a direction parallel to said path of travel when said first subassembly has arrived into said abutting contact with said second subassembly for pressing said first subassembly against said second subassembly and for causing, during continued application of said torque by said first drive means, a relative axial motion between said first component and said first supporting element against said resetting force to eliminate said clearance and to place said blocking means into said engaged state for preventing, after removal of said torque applied by said first drive means, a rotation of said first component in response to a reaction torque derived from said pressing force and applied by said second component to said first component; and (i) a second supporting element disposed in series with said first supporting element as viewed along said path of travel; said second drive means being supported in said second supporting element and applying said linear force to said first supporting element.

2. The apparatus as defined in claim 1, wherein said first component of said ball screw/nut mechanism is a ball screw and said second component of said ball screw/nut mechanism is a ball nut.

3. The apparatus as defined in claim 1, wherein said apparatus is an injection molding machine, said first subassembly is a movable mold carrier and said second subassembly is a stationary mold carrier.

4. The apparatus as defined in claim 1, wherein said blocking component is a blocking disc positioned coaxially with said first component.

5. The apparatus as defined in claim 4, wherein said blocking disc comprises an annular rim projecting towards said counter face and said counter face constitutes an annular surface of a ring affixed to said supporting element; said annular rim and said annular surface being in a frictional engagement with one another in said engaged state of said blocking means such that said frictional engagement resists said reaction torque applied by said second drive means to said first component through said second component.

6. The apparatus as defined in claim 1, wherein said first supporting element includes a fitting strip; further wherein said second drive means comprises a hydraulic driving unit including a movable piston coupled to said fitting strip; said clearance being a first clearance; further comprising additional resilient resetting means for urging said piston in a direction away from said second subassembly to maintain a second clearance between said piston and said second supporting element; said second clearance constituting a stroke of said piston; said second clearance being greater than said first clearance.

7. The apparatus as defined in claim 1, wherein said first drive means comprises (a) a motor having a rotary motor shaft;
(b) a pulley affixed to said first component and forming said blocking component; and
(c) a drive belt trained about said motor shaft and said pulley.

8. The apparatus as defined in claim 3, wherein one of said first and second components of said ball screw/nut mechanism is a ball screw and the other of said first and second components of said ball screw/nut mechanism is a ball nut; wherein the first subassembly further comprises a motion unit guidably mounted on a base, said motion unit including a tube for receiving said ball screw therein, a third supporting element supporting said tube, and a tension rod extending from said third supporting element to the movable mold carrier for clamping said tube between said third supporting element and the movable mold carrier; said ball nut being supported by said third supporting element.

9. An injection molding machine comprising (a) a movable mold carrier linearly movable in a path of travel;
(b) a stationary mold carrier positioned in alignment with said path of travel; said movable mold carrier being movable into an abutting contact with said stationary mold carrier;
(c) a supporting element positioned in alignment with said path of travel;
(d) a ball screw/nut mechanism composed of
 (1) a ball screw held in said supporting element for rotation and axial displacement relative thereto;
 (2) a ball nut threadedly mounted on said ball screw and being arranged for linear travel relative to said ball screw upon rotation of said ball screw; said movable mold carrier being attached to said ball nut for travelling therewith along said path of travel;
(e) blocking means having an engaged state for preventing rotation of said ball screw and a disengaged state for allowing rotation of said ball screw; said blocking means including
 (1) a blocking component affixed to said ball screw to axially move therewith as a unit; and
 (2) a counter face carried on said supporting element; said counter face being in engagement with said blocking component in said engaged state of said blocking means;
(f) resilient resetting means for axially urging, with a resetting force, said ball screw outwardly of said supporting element to maintain a clearance between said blocking component and said counter face in said disengaged state of said blocking means;
(g) first drive means for imparting a torque to said ball screw in said disengaged state of said blocking means as long as said clearance is present in any magnitude to urge said ball screw into rotation for causing said ball nut and said movable mold carrier to travel towards said stationary mold carrier until said movable mold carrier assembly arrives into an abutting contact with said stationary mold carrier;
(h) second drive means for imparting a linear pressing force to said ball screw towards said stationary mold carrier in a direction parallel to said path of travel when said movable mold carrier has arrived into said abutting contact with said stationary mold carrier for pressing said movable mold carrier against said stationary mold carrier and for causing, during continued application of said torque by said first drive means, a relative axial motion between said ball screw and said supporting element against said resetting force to eliminate said clearance and to place said blocking means into said engaged state for preventing, after removal of said torque applied by said first drive means, a rotation of said ball screw in response to a reaction torque derived from said pressing force and applied by said ball nut to said ball screw; and
(i) a motion unit guidably mounted on a base and being attached to said movable mold carrier, said motion unit including
 (1) a tube for receiving said ball screw therein;
 (2) a further supporting element supporting said tube and said ball nut; and
 (3) a tension rod extending from said further supporting element to said movable mold carrier for clamping said tube between said further supporting element and said movable mold carrier.

* * * * *